United States Patent [19]

Hanatani et al.

[11] Patent Number: 5,170,024
[45] Date of Patent: Dec. 8, 1992

[54] HEAT COOKING APPARATUS WITH PHOTOCONDUCTIVE ELEMENT AND THERMISTOR

[75] Inventors: Sakio Hanatani, Nara; Fuminori Kaneko, Matsubara, both of Japan

[73] Assignee: Sharp Kabushiki Kaisha, Osaka, Japan

[21] Appl. No.: 666,915

[22] Filed: Mar. 11, 1991

[30] Foreign Application Priority Data

Mar. 28, 1990 [JP] Japan .................. 2-32485[U]

[51] Int. Cl.$^5$ ............................................. H05B 6/68
[52] U.S. Cl. ..................... 219/10.55 B; 219/10.55 E; 219/494; 219/504; 374/131; 374/149; 99/325
[58] Field of Search .............. 219/10.55 B, 10.55 E, 219/494, 497, 504; 99/325; 374/129, 130, 131, 149

[56] References Cited

U.S. PATENT DOCUMENTS

| | | | |
|---|---|---|---|
| 4,220,840 | 9/1980 | Barker | 219/10.55 B |
| 4,426,572 | 1/1984 | Tachikawa et al. | 219/10.55 B |
| 4,433,232 | 2/1984 | Tachikawa et al. | 219/497 X |
| 4,488,026 | 12/1984 | Tanabe | 219/10.55 B |
| 4,499,357 | 2/1985 | Kojima | 219/10.55 B |
| 4,734,553 | 3/1988 | Noda | 219/10.55 B |

FOREIGN PATENT DOCUMENTS 57-150731 9/1982 Japan .
58-140524 8/1983 Japan .
2184834 12/1986 United Kingdom .

Primary Examiner—Philip H. Leung

[57] ABSTRACT

A heat cooking apparatus arranged to cook a food article through heating by projecting microwave energy generated by a magnetron and heat rays produced by an electric heating unit onto the food article placed in a heating chamber, and including a light source for projecting visible light rays onto the food article, a photo-detector for detecting a light amount of the visible light rays reflected by the food article, a temperature sensor for detecting temperature within the heating chamber, and a control unit which monitors variation with time of detection signals from the photo-detector and the temperature sensor during heating of the food article by the electric heating unit and controls to complete the heating of the electric heating unit by judging that the heating is to be terminated when the detection signal of the photo-detector is reduced by a predetermined value from a maximum value, and the detection signal of the temperature sensor is increased by a predetermined value from an initial value.

16 Claims, 5 Drawing Sheets

HEAT COOKING APPARATUS WITH PHOTOCONDUCTIVE ELEMENT AND THERMISTOR

BACKGROUND OF THE INVENTION

The present invention generally relates to a heating and cooking apparatus, and more particularly to a heat cooking apparatus such as a grill oven range in which an electric heating means is added to a microwave oven.

A so-called grill oven range as referred to above is generally so arranged to heat an object or food article to be cooked within a heating chamber by microwave energy, and also, to form scorching or burning on the surface of the food article by heat rays of an electric heating means or electric heater.

Conventionally, for adjusting the state of scorching in the grill heating in such a grill oven range, it has been a general practice that a cook manually turns on or off the electric heater through visual examination on the surface of the food article, or sets a timer of the electric heater in addition to the heating time of the food article obtained by experience. Meanwhile, as a new practice, there has been recently proposed a method in which visible light rays from a light source are projected onto a food article being heated, and the light amount of the visible light rays reflected by the food article is detected by a photo-detector so as to judge the state of scorching based on the variation with time of the detection signal, whereby heating by the electric heater is suspended upon arrival at a predetermined state of scorching, as disclosed, for example, in Japanese Patent Laid-Open Publication Tokkaisho No. 58-140524 or Tokkaisho No. 57-150731.

Although the above new practice is an epoch-making process in that the reduction of light amount of the reflected visible light rays favorably corresponds to the progress of scorching, there is such a disadvantage that, in spite of the fact that shapes of food articles to be subjected to the grill heating differ and there is a large difference in the food article color before and after the heating as in meat and fish, etc. with consequent variations in the reflected light amount, no particular countermeasures are taken therefor, and only the reflected light amount is regarded as a judging standard of the state for scorching. Accordingly, it is difficult to accurately judge all the states of scorching for various food articles, thus resulting in over-scorching or insufficient scorching depending on the kinds of food articles to be dealt with.

Furthermore, in the above new practice, since a photodiode is employed as a photo-detector for detecting the reflected light amount, the detection signal tends to drift to a large extent since it is affected by high ambient temperatures in the vicinity of the heating chamber, thus requiring a cooling device or complicated temperature compensating circuit for the prevention thereof, or necessitating an amplifier due to a low level of the detection signal, with consequent complication in the construction of the apparatus and increase in cost on the whole.

SUMMARY OF THE INVENTION

Accordingly, an essential object of the present invention is to provide a heat cooking apparatus which is capable of controlling grill heating so as to form optimum scorching on a food article by accurately judging state of scorching of various food articles during the grill heating, through employment of a photo-detector means other than a photodiode or a plurality of detecting means.

Another object of the present invention is to provide a heat cooking apparatus of the above described type which is simple in construction and stable in functioning, and can be readily manufactured at low cost.

In accomplishing these and other objects, according to one preferred embodiment of the present invention, there is provided a heat cooking apparatus arranged to cook a food article through heating by projecting microwave energy generated by a magnetron and heat rays produced by an electric heating means, onto the food article placed in a heating chamber, and including a light source for projecting visible light rays onto said food article, a photoconductive element for detecting a light amount of the visible light rays reflected by the food article, a temperature sensor for detecting temperature within said heating chamber, and a control means which monitors variations, in time, of detection signals from said photo-detector and said temperature sensor during heating of the food article by said electric heating means and controls to complete the heating of said electric heating means by judging that the heating is to be terminated when the detection signal of the photoconductive element is reduced by a predetermined value from a maximum value, and the detection signal of said temperature sensor is increased by a predetermined value from an initial value.

According to a second embodiment of the present invention, there is also provided a heat cooking apparatus arranged to cook a food article through heating by projecting microwave energy generated by a magnetron and heat rays produced by an electric heating means, onto the food article placed in a heating chamber. The heat cooking apparatus includes a light source for projecting visible light rays onto said food article, a photo-conductive element which receives the visible light rays as reflected by the food article so as to vary its resistance value according to the light amount thereof, and applied with a constant voltage through a reference resistance connected in series thereto, a plurality of resistors selectably connected in parallel to said reference resistance, a detection sensitivity adjusting means for selectively connecting said resistors so that voltage drop values in said photo-conductive element and said reference resistance become approximately equal to each other, at starting of heating of the food article by said electric heating means, and a control means which monitors variation with time of the detection signal from said photo-conductive element after the detection sensitivity adjustment and controls to complete the heating by said electric heating means by judging that the heating is to be terminated when the detection signal is reduced by a predetermined value from a maximum value.

More specifically, in the above second embodiment, the temperature sensor employed in the first embodiment is omitted, and the photo-detector is constituted by the photo-conductive element applied with the constant voltage through the reference resistance connected in series thereto, and varied in the resistance value according to the light amount received, with the specific resistor selected from the plurality of resistors being adapted to be connected in parallel to said reference resistance so that when heating of the food article by the electric heating means begins voltage drop values in the photo-conductive element and the reference resistance are set approximately equal to each other by the detection sensitivity adjusting means, while only the variation with time of the detecting signal from the photo-conductive element after the detection sensitivity adjustment is monitored by the control means.

In the heat cooking apparatus of the first embodiment, when the electric heating means heats the food article placed in the heating chamber, the photo-detector receives the visible light rays emitted from the light source and reflected by the food article to produce the detection signal corresponding to the received light amount, while the temperature sensor detects the temperature within the heating chamber and outputs the detection signal. The control means monitors the variation with time of both of the above detection signals, and judges the heating to be completed when the detection signal of the photo-detector is reduced by the predetermined specific value from the maximum value, while the detection signal of the temperature sensor is increased by the predetermined specific value from the initial value, thereby to control the termination of heating by the electric heating means. Since both of the above specific values are properly predetermined according to the type of food articles to be heated, the respective food articles are subjected to the grill heating until the optimum scorching is achieved.

Meanwhile, in the heat cooking apparatus of the second embodiment, when the electric heating means starts heating the food article within the heating chamber, the photo-conductive element applied with the constant voltage through the reference resistance connected in series thereto, receives the visible light rays emitted from the light source and reflected by the food article so as to output the detection signal corresponding to the received light amount. Simultaneously, the detection sensitivity adjusting means selects the specific resistor from the plurality of resistors for connection in parallel with said reference resistance so that the voltage drop values in the photo-conductive element and the reference resistance are approximately equal to each other. Then, the control means monitors the variation with time of the detection signal from the photo-conductive element after the detection sensitivity adjustment, and terminates heating when the detection signal is reduced by the specific value from the maximum value. By the above adjustment of the detection sensitivity, variation of the detection signals due to various factors are corrected, and since the specific values as referred to above may be properly provided in advance for the type of food articles to be heated, the respective food articles can be heated through grill heating until optimum scorching is achieved.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
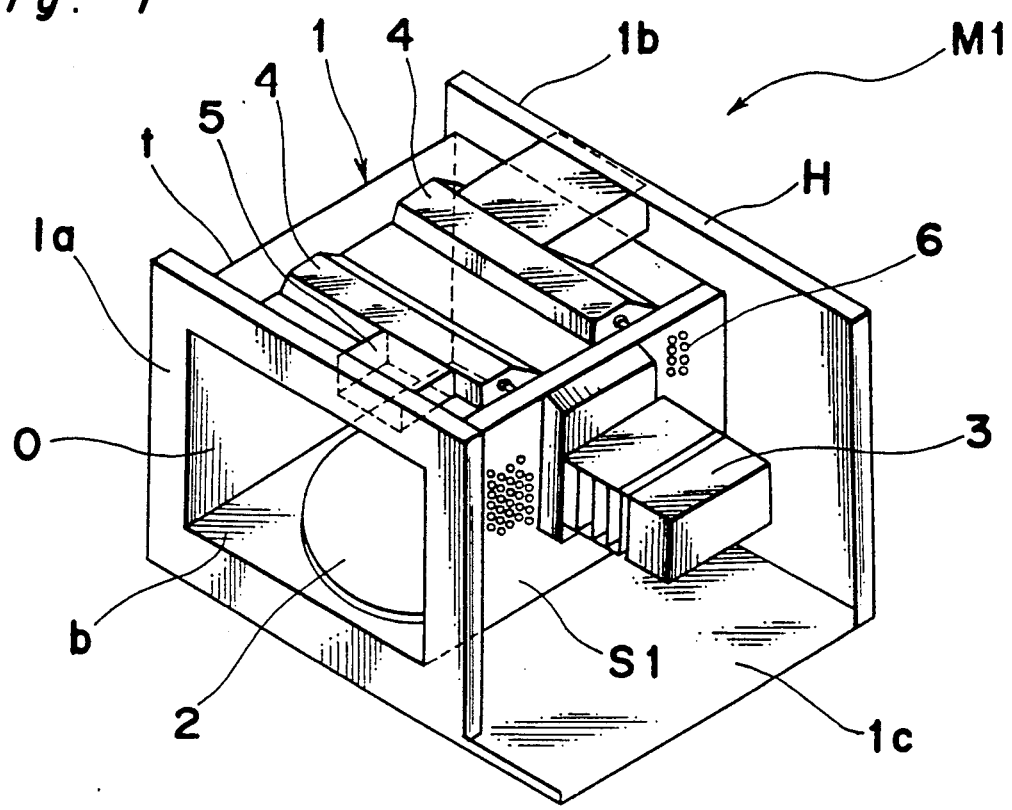
FIG. 1 is a perspective view of a heat cooking apparatus according to one preferred embodiment of the present invention, with top and side walls removed for clarity.

Before the description of the present invention proceeds, it is to be noted that like parts are designated by like reference numerals throughout the accompanying drawings.

Figure 2:
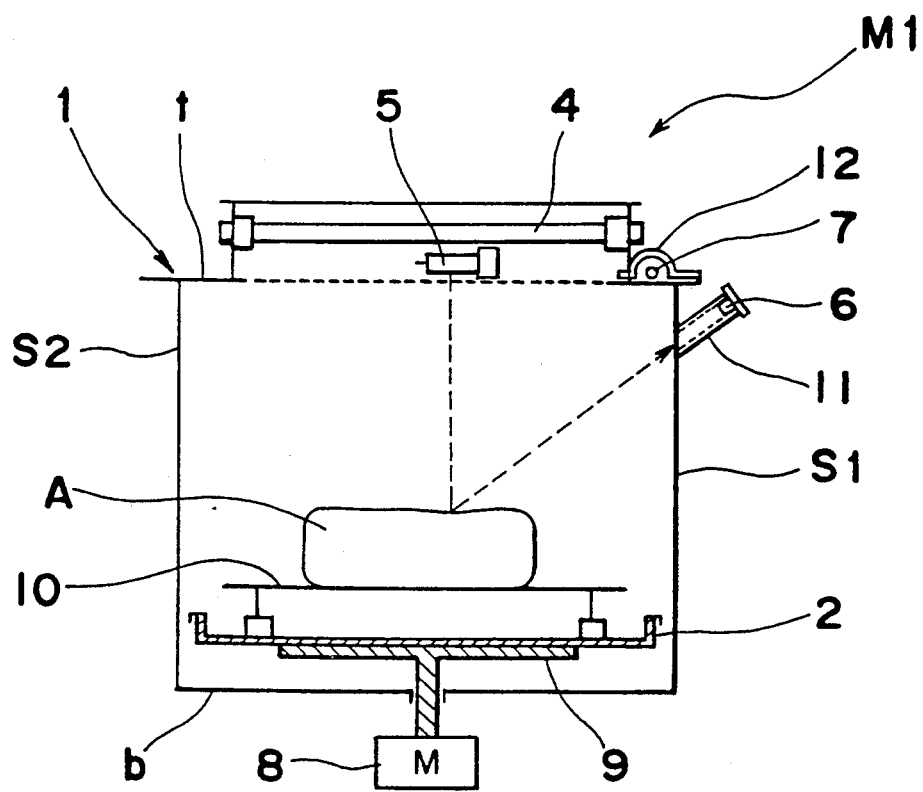
FIG. 2 is a schematic longitudinal sectional view of the heat cooking apparatus of FIG. 1.

Referring now to the drawings, there is shown in FIGS. 1 and 2, a heat cooking apparatus M1 according to one preferred embodiment of the present invention, which generally includes a housing H having a front wall 1a, a rear wall 1b, and a bottom wall 1c, and also a top wall and side walls removed for clarity in FIG. 1, a heating chamber 1 in a rectangular box-like configuration defined by side plates S1 and S2, and top and bottom plates t and b between the front wall 1a formed with an access opening 0 for selective opening and closing of a door (not shown) and the rear wall 1b, a turn table 2 rotatably provided on a bottom portion within said heating chamber 1 for placing a food article A therein, a magnetron 3 mounted on one side plate S1 of the heating chamber 1 for irradiating microwave energy onto the food article A, and electric heating means or electric heaters 4 provided on the top plate t of the heating chamber 1 for projecting heat rays onto the food article A, a halogen lamp 5 also provided on the top plate t of the chamber 1 for projecting visible light rays onto the food article A, a photo-conductive element 6 as a photo-detector for detecting light amount of the visible light rays reflected by the food article A, and a thermistor 7 (FIG. 2) as a temperature sensor for detecting the temperature within the heating chamber 1.

As is most clearly seen in FIG. 2, the turn table 2 is mounted on a support base 9 to be driven for rotation by a motor 8, with the food article A being placed on the upper surface of the turn table 2 through a net rack 10 or the like. The photo-conductive element 6 of CdS (cadmium sulfide) is fixedly mounted slantwise through a support member 11 at the upper portion of one side plate S1 of the heating chamber 1 so as to receive visible light rays emitted by the halogen lamp 5 and reflected by the food article A as shown by a dotted line arrow in FIG. 2. The thermistor 7 is fixed at the corner portion of the top wall of the heating chamber 1 by a fixture 12 as shown. The heat cooking apparatus M1 further includes a microcomputer 16 (FIGS. 3 and 5) as a control means for controlling the electric heating means 4 based on monitoring of variation with time of detection signals from the photo-conductive element 6 and the thermistor 7.

Figure 3:
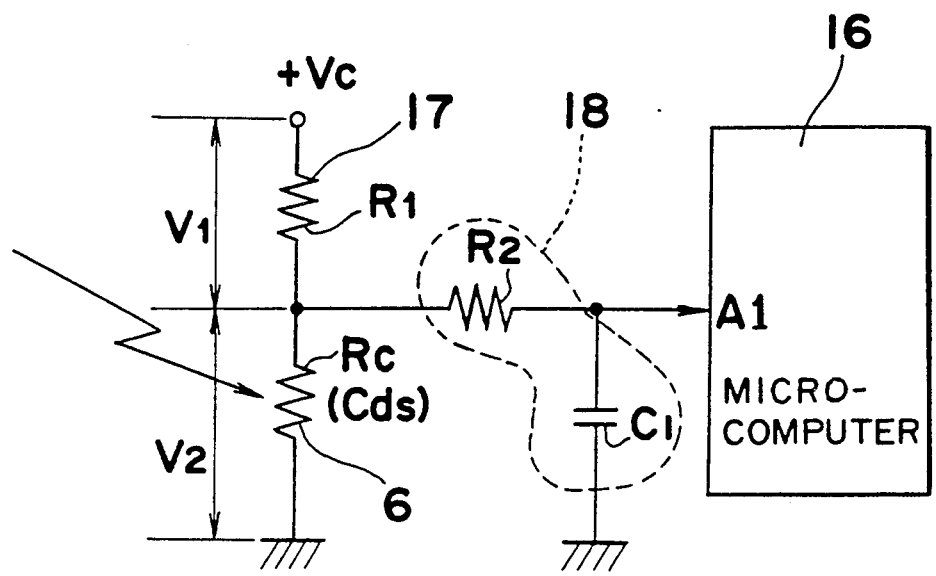
FIG. 3 is a schematic circuit diagram showing a control means based on a detection signal of a photo-detecting element employed in the heat cooking apparatus of FIG. 1.

As shown in FIG. 3, the microcomputer 16 receives, at an A/D port A1 through a filter 18 including a resistor R2 and a capacitor C1, a voltage drop V1 of a reference resistor 17 (resistance value R1) applied with a constant voltage Vc through the photo-conductive element 6 (resistance value Rc) connected in series thereto. In the voltage drop V1 represented as $$V1 = R1 \cdot Vc/(R1+Rc),$$

since Rc is reduced as the amount of light reception of the photo-conductive element 6 is increased, the voltage drop V1 is increased or decreased according to the increase or decrease of the received light amount.

Figure 4:
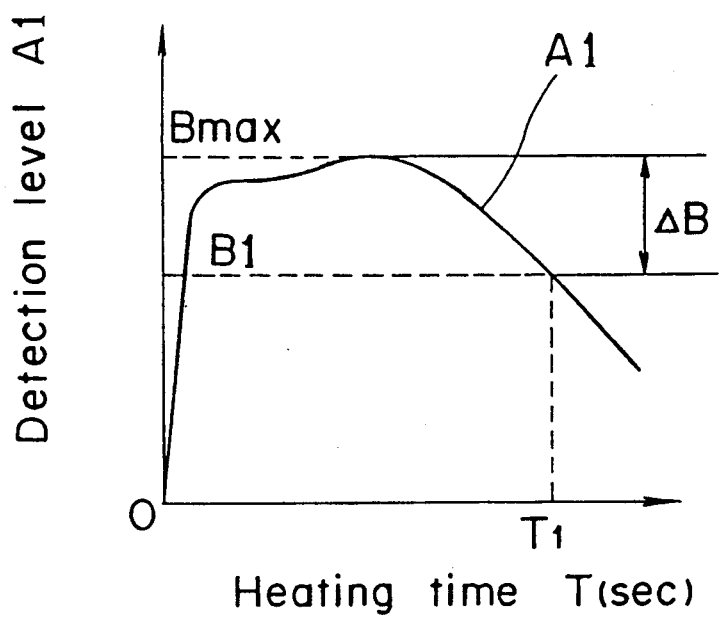
FIG. 4 is a graphical diagram showing an example of the detection signal referred to in FIG. 3.

FIG. 4 shows one example of the variation with time of the above voltage drop to be inputted to the A/D port A1 so as to be converted into a digital value, during heating of the food article A by the electric heating means 4. More specifically, as shown by a curve A1 in FIG. 4, after being rapidly increased transitionally upon turning on of a power supply for the electric heating means 4, the detection level of the photo-conductive element 6 reaches a maximum level B max through gradual increase by the reflection light amount which is gradually increased at the early stage of grill heating, and thereafter, is decreased according to the reflection light amount which is decreased as the scorching proceeds. The microcomputer 16 is configured to hold the above maximum level B max, and to measure and retain the heating time T1 until the detection level reaches B1 through decrease from the above maximum level B max by the predetermined value ΔB preliminarily given as a value specific to the type of food article A.

Figure 5:
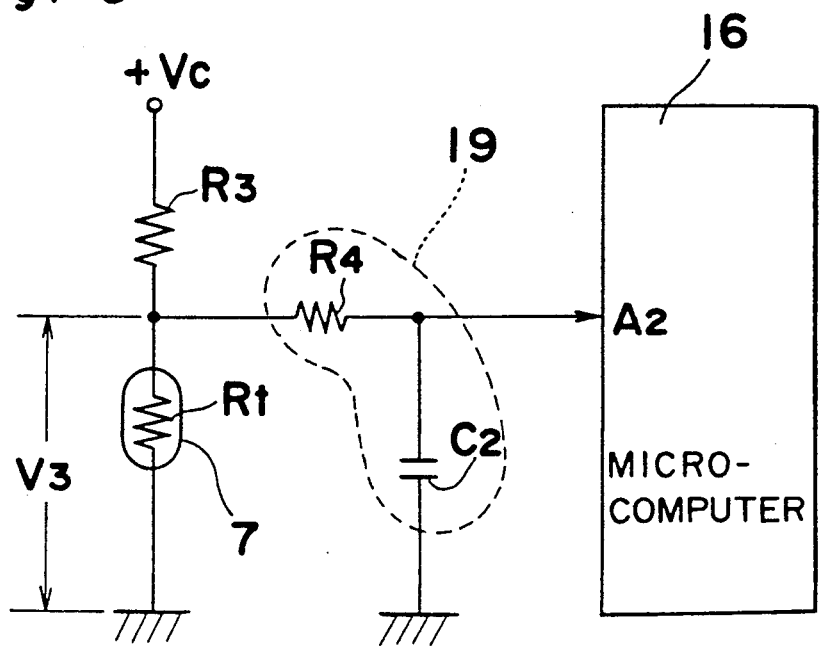
FIG. 5 is a schematic circuit diagram showing a control means based on a detection signal of a temperature sensor employed in the heat cooking apparatus of FIG. 1.

As shown in FIG. 5, the microcomputer 16 also receives, at its A/D port A2 through a filter 19 including a resistor R4 and a capacitor C2, a detection voltage V3 of the thermistor 7 applied with a constant voltage Vc through a reference resistor R3.

Figure 6:
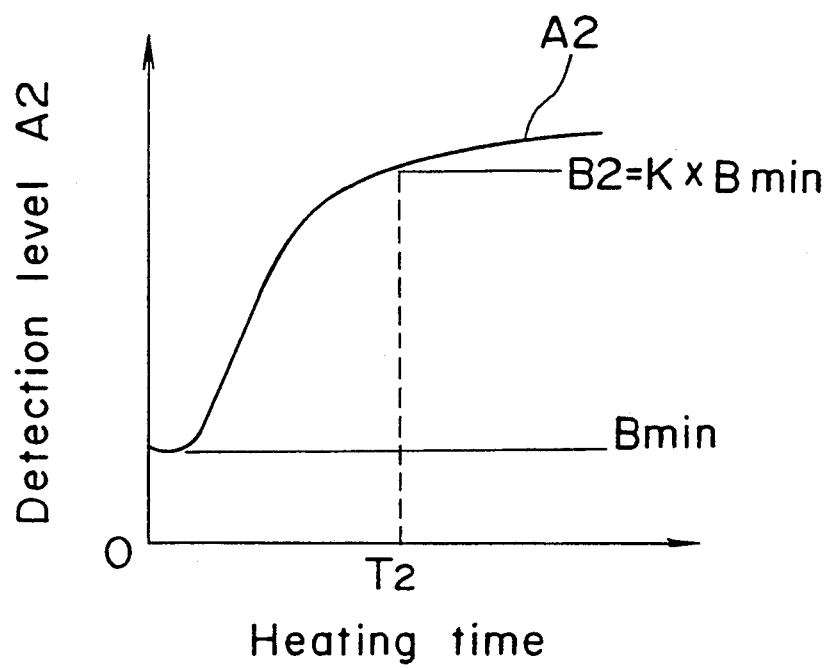
FIG. 6 is a graphical diagram showing an example of the detection signal referred to in FIG. 5.

FIG. 6 shows one example of the variation with time of the above detection voltage V3 to be inputted to the A/D port A2 so as to be converted into the digital value, during heating of the food article A by the electric heating means 4. More specifically, as shown by a curve A2 in FIG. 6, the detection level of the thermistor 7 increases so as to gradually approach a saturation value by a resistance value Rt of the thermistor 7 to be reduced as the temperature of the heating chamber 1 rises.

Similarly, the microcomputer 16 is arranged to hold a minimum level B min at the early stage, and to measure, and retain the heating time T2 until the detection level reaches B2=K×B min (where K is a factor preliminarily given as a value specific to the type of food article).

The microcomputer 16 further sets the larger time in the above measured time T1 or T2 as a heating completion starting time To so as to multiply To, for example, by K/8 (where K is the factor referred to earlier) as an additional heating factor for continuing power supply to the electric heating means 4 by the time represented by To×K/8, and thereafter, stops the power supply. The microcomputer 16 is also arranged to gradually decrease the supply power to be zero over the time of To×K/8 or to stop the power supply immediately at the timepoint of the heating completion starting time To according to the set heating completion mode.

Operation of the heat cooking apparatus M1 as described so far will be explained hereinafter.

Upon turning on the power supply for the electric heating means 4 of the heat cooking apparatus M1, when the electric heating means 4 starts heating the food article A within the heating chamber 1 for grill heating, the photo-conductive element 6 receives the visible light rays emitted from the halogen lamp 5 and reflected by the food article A so as to output the detection voltage V, corresponding to the received light amount, while the thermistor 7 detects the temperature within the heating chamber 1 and outputs the detection voltage V3.

The microcomputer 16 monitors the variation with time (as shown in FIGS. 4 and 6) of the both detection voltages V1 and V3 inputted to the A/D ports A1 and A2, and measures the heating time T1 until the detection level A1 in FIG. 4 reaches B1 through decrease by the predetermined value ΔB from the maximum level B max, and the heating time T2 until the detection level A2 of FIG. 6 reaches B2=K×B min from the minimum level B min, while it also sets the larger time in the measured heating time T1 or T2 as the heat completion starting time T0, which is multiplied, for example, by K/8 as the additional heating factor. Thus, according to the heating completion mode preliminarily set, the power supply is suspended after continuing energization of the electric heating means 4 by the time To×K/8, gradually reduced towards zero over the time period To×K/8, or immediately stopped at the timepoint of the heating completion starting time To.

By the arrangement of the heat cooking apparatus M1 according to the present invention as described so far, since the factor K for determining the specific value ΔB at the detection level A1 of the photo-conductive element 6 and the specific level B2 at the detection level A2 of the thermistor 7 can be properly preset according to the kinds of the food articles A to be heated by the grill heating (e.g. meat, fish, or principal food such as rice or the like), the grill heating by the electric heating means 4 is effected until optimum scorching is formed on each food article. Moreover, owing to the arrangement to control the on-time of the electric heating means 4 based on the temperature within the heating chamber by the thermistor 7, as well as the reflection light amount by the photo-conductive element 6, the state of scorching of each food article may be controlled more accurately, thus not giving rise to over-scorching or under-scorching according to the kinds of food articles. Furthermore, the photo-conductive element 6 of CdS employed as the photo-detecting element instead of a photodiode can provide a large detection voltage V2 even without use of an amplifier for simplification of the circuit.

Figure 7:
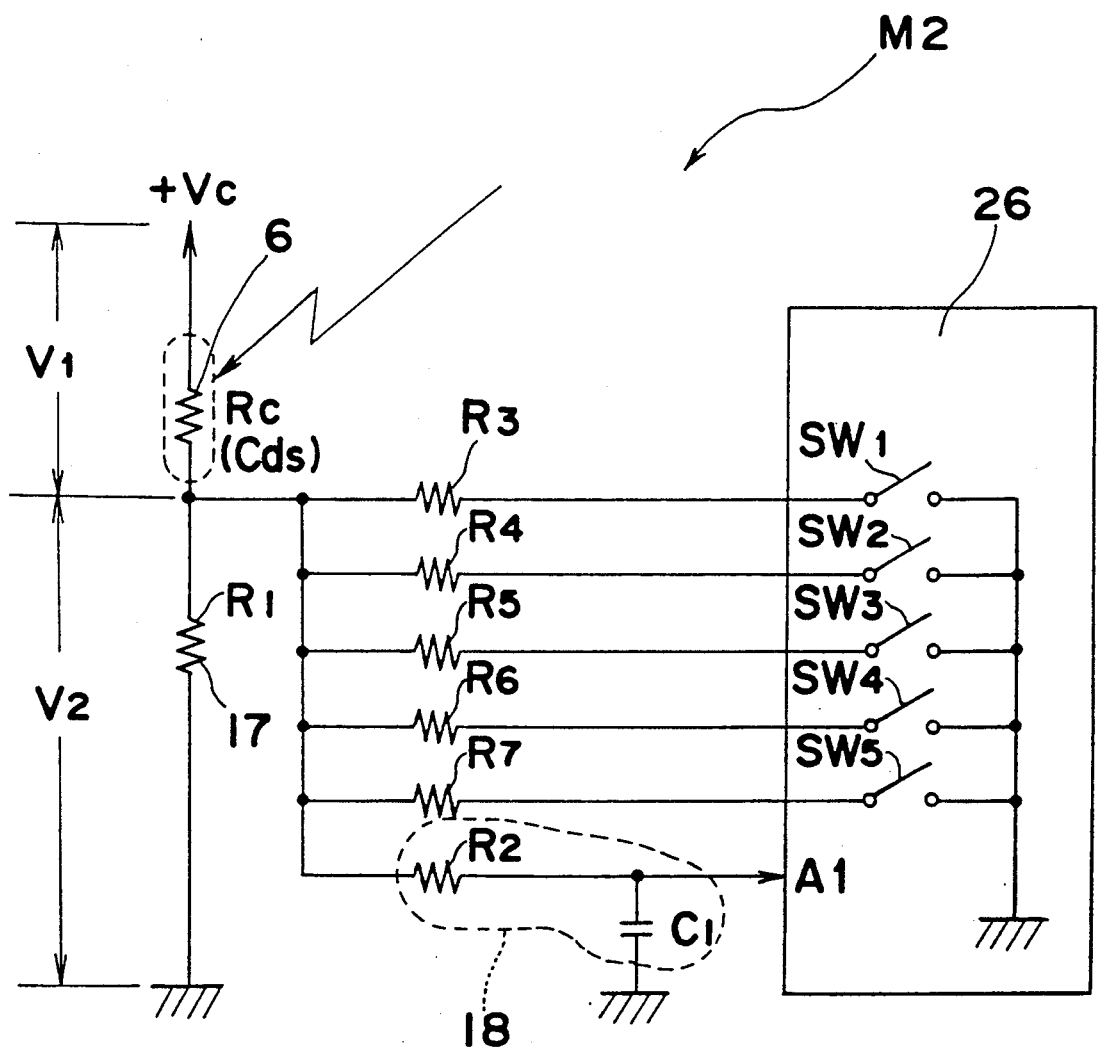
FIG. 7 is a schematic circuit diagram showing an essential portion of a heat cooking apparatus according to a second embodiment of the present invention.

Referring further to FIG. 7, there is shown a circuit diagram representing an essential portion of a heat cooking apparatus M2 according to a second embodiment of the present invention.

In the arrangement of FIG. 7, the thermistor 7 described as employed in the heat cooking apparatus M1 of the first embodiment (FIGS. 1 and 5) is dispensed with, and the photo-conductive element 6 and the reference resistance 17 are connected in series in a reverse order with respect to the power supply Vc as shown, while five resistors R3,R4,R5,R6 and R7 having different resistance values and connected in a parallel relation with respect to the reference resistance 17 are respectively grounded through switches SW1,SW2,SW3,SW4 and SW5, which are subjected to the on/off control by a microcomputer 26 for effecting control similar to that in the first embodiment, thereby to provide a detection sensitivity adjusting means.

Since other construction of the heat cooking apparatus M2 in FIG. 7 is similar to that of the heat cooking apparatus M1 of the first embodiment, detailed description thereof is abbreviated here for brevity of explanation.

The function of the microcomputer 26 as referred to above is as follows.

Figure 8:
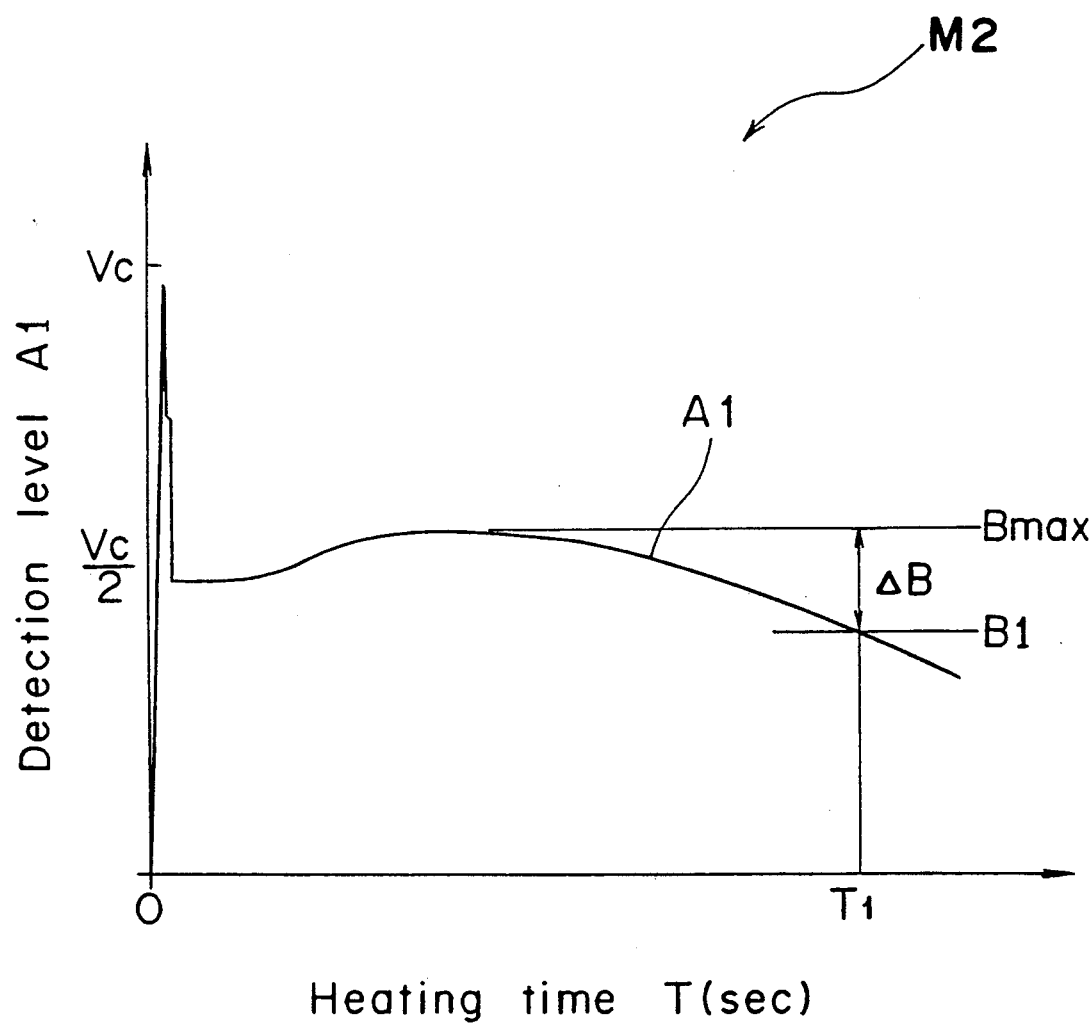
FIG. 8 is a graphical diagram showing an example of the detection signal related to the heat cooking apparatus of FIG. 7.

The microcomputer 25 turns off all the switches SW1 to SW5 at the start of heating by the electric heating means 4, and receives, at its A/D port A1, the voltage drop V2 of the reference resistance 17 (resistance value R1) applied with the constant voltage Vc through the photo-conductive element 6 (resistance value Rc). The voltage drop V2 is represented as $$V2 = R1 \cdot Vc/(R1+Rc),$$

and since Rc is rapidly reduced by the halogen lamp 5 which is lit upon the beginning of heating, the detection level A1 of the photo-conductive element is rapidly increased close to Vc as shown in FIG. 8. The microcomputer 26 selects the optimum resistance Ri (i=3-7) so as to set the above detection level at about Vc/2 by turning on the corresponding switch SWi. In other words, the switch SWi by which the initial resistance value Rc of the photo-conductive element 6 and the composite resistance value R1Ri/(R1+Ri) of the reference resistance 17 and the resistance Ri become equal to each other, i.e. the switch SWi of the resistor Ri closest to Ri=RcR1/(R1−Rc) in the resistance value is turned on. By the above function, the detection level A1 becomes approximately Vc/2 as shown in FIG. 8, and thereafter, varies along the curve A1 similar to that referred to earlier in FIG. 4. Accordingly, the on/off control of the electric heating means 4 by the microcomputer 26 based on the detection voltage V1 is generally similar to that described earlier with reference to FIG. 4 except that it is not based on the detection voltage V3 from the thermistor 7. Therefore, detailed description thereof is also abbreviated here for brevity.

In the second embodiment of the present invention as described above, although the temperature within the heating chamber by the thermistor 7 is not used for the control parameter, since it is so arranged to measure the resistance value Rc of the photo-conductive element 6 which largely varies according to manufacturing factors, shape of the food article reflecting light rays, etc. at the early state of heating, and the adjust the detection sensitivity to the optimum state by changing-over the parallel resistors for the control of the heating time through employment of the detection signal after the detection sensitivity adjustment, the respective food articles may be optionally scorched in a similar manner as in the first embodiment. Furthermore, through employment of the photo-conductive element 6 of CdS, circuit construction may be advantageously simplified.

As is clear from the foregoing description, the heat cooking apparatus according to the present invention is arranged to cook the food article through heating by projecting microwave energy generated by the magnetron and heat rays produced by the electric heating means onto the food article placed in the heating chamber, and includes the light source for projecting visible light rays onto the food article, a photo-detector for detecting a light amount of the visible light rays reflected by the food article, a temperature sensor, for detecting temperature within the heating chamber, and the control means which monitors variation with time of detection signals from the photo-detector and the temperature sensor during heating of the food article by the electric heating means and controls to complete the heating of the electric heating means by judging that the heating is to be terminated when the detection signal of the photo-detector is reduced by the predetermined specific value from the maximum value and the detection signal of the temperature sensor is increased by the predetermined specific value from the initial value. Therefore, by setting both of the above predetermined values according to the kinds of food articles, and controlling the on time of the electric heating means based not only on the reflected light amount, but on the temperature in the heating chamber as a parameter, the state of scorching of the food articles by the grill heating can be more accurately controlled, thereby to effect the optimum grill heating without over-scorching or under-scorching of the food articles.

Meanwhile, when the above arrangement is so modified that the temperature sensor employed in the first embodiment is omitted, and the photo-detector is constituted by the photo-conductive element applied with the constant voltage through the reference resistor connected in series thereto, and varied in the resistance value according to the light amount received, with the specific resistor selected from the plurality of resistors being adapted to be connected in parallel to said reference resistor so that at the beginning of heating of the food article by the electric heating means, voltage drop values in the photo-conductive element and the reference resistor become approximately equal to each other by the detection sensitivity adjusting means, while only the variation with time of the detecting signal from the photo-conductive element after the detection sensitivity adjustment is monitored by the control means for effecting the similar control as in the first embodiment, the state of scorching may be accurately determined by the detection sensitivity adjustment even without employment of the temperature in the heating chamber as the control parameter, and thus, the optimum grill heating without over-scorching or under-scorching of food articles can be effected by setting the above predetermined values according to the type of food articles, while simplification of the circuit construction and consequent cost reduction may also be achieved through employment of the photo-conductive element such as CdS.

Although the present invention has been fully describe by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An apparatus for cooking, comprising:
   a heating chamber for placing a food article;
   selection means for selecting a predetermined reflection value and a predetermined temperature value, said values being a function of the food article;
   magnetron means for irradiating microwave energy onto the food article;
   electric heating means for generating heat waves for scorching the food article;

light source means for generating visible light rays the directing the visible light rays toward the food article;

photoconductive element means for receiving the visible light rays which have been reflected by the food article and generating a reflection signal;

temperature sensor means for detecting a temperature of said heating chamber and for generating a temperature signal; and control means for receiving and comparing the reflection signal to maximum reflection signal, for receiving and comparing the temperature signal to a minimum temperature value, and for terminating cooking by said apparatus when a difference between the reflection signal and the maximum reflection signal exceeds the predetermined reflection value and a difference between the temperature signal and the minimum temperature value exceeds the predetermined temperature value, thereby optimizing cooking and scorching of the food article.

2. The apparatus of claim 1, wherein said photoconductive element means is constructed of cadmium sulfide, and fixedly mounted, slantwise, through a support member at an upper portion of one side plate of said heating chamber.

3. The apparatus of claim 1, wherein said temperature sensor means is a thermistor, fixedly mounted at a corner portion of a top plate of said heating chamber.

4. The apparatus of claim 1, wherein said control means is a microcomputer.

5. The apparatus of claim 4, said microcomputer receiving a first reference voltage drop across a first reference resistor and a first constant voltage drop across said photoconductive element means, at a first A/D portion via first filtering means;

wherein the first constant voltage drop is less than the first reference voltage drop.

6. The apparatus of claim 5, wherein the first reference voltage drop and the first constant voltage drop are related by:

$$V1 = R1 * Vc/(R1 = Rc)$$

where,
V1 = the first reference voltage drop,
R1 = resistance of the first reference resistor,
Vc = the first constant voltage drop, and,
Rc = resistance of said photoconductive element means.

7. The apparatus of claim 5, said microcomputer receiving a second reference voltage drop across a second reference resistor means, at a second A/D port, via second filtering means.

8. The apparatus of claim 7, where a value of the temperature signal generated by said temperature sensor means equals the minimum temperature value times a food factor, unique to the food article, and the predetermined temperature equals the value of the temperature signal minus the minimum temperature value.

9. The apparatus of claim 4, said microcomputer increasing a value of the reflection signal to the maximum reflection signal and thereafter decreasing the value of the reflection signal until the difference between the reflection signal and the maximum reflection signal exceeds the predetermined reflection value.

10. An apparatus for cooking, comprising:
a heating chamber for placing a food article;

selection means for selecting a predetermined reflection value, said value being a function of the food article;

magnetron means for irradiating microwave energy onto the food article;

electric heating means for generating heat waves for scorching the food article;

light source means for generating visible light rays and directing the visible light rays toward the food article;

photoconductive element means for receiving the visible light rays which have been reflected by the food article and generating a reflection signal, a resistance of said photoconductive element means varying depending on an amount of visible light rays received;

reference resistance means for applying a constant voltage to said photoconductive element means;

a plurality of resistors, selectably connected in parallel to said reference resistance means; and control means for selecting one of the plurality of resistors so that the constant voltage applied to said photoconductive element means is approximately equal to a voltage drop across said reference resistance means when cooking commences, for receiving and comparing the reflection signal to a maximum reflection signal and for terminating cooking by said apparatus when a difference between the reflection signal and the maximum reflection signal, exceeds the predetermined reflection value, thereby optimizing cooking and scorching of the food article.

11. The apparatus of claim 10, wherein said photoconductive element means is constructed o cadmium sulfide, fixedly mounted slantwise, through a support member at an upper portion of one side plate of said heating chamber.

12. The apparatus of claim 10, wherein said control means is a microcomputer.

13. The apparatus of clam 12, said microcomputer receiving a reference voltage drop across a reference resistor at an A/D port, via filtering means, and a constant voltage drop across said photoconductive element means, via said plurality of resistors;

wherein the constant voltage drop is greater than the reference voltage drop.

14. The apparatus of claim 13, wherein the first reference voltage drop and the constant voltage drop are related by:

$$V1 = R1 * Vc/(R1 = RC)$$

where,
V1 = the reference voltage drop,
R1 = resistance of the reference resistor.
Vc = the constant voltage drop, and,
Rc = resistance of said photoconductive element means.

15. The apparats of claim 12, said microcomputer selecting one of the plurality of resistors such that a detection level of said photoconductive element means is one half of the constant voltage drop.

16. The apparatus of claim 15, wherein the selected one of the plurality of resistors has a resistance closest to a target resistance, such that $$Rc = Rc * R1(R1 - RC)$$

where,
Rc = the target resistance,
Rc = resistance of said photoconductive means, and
R1 = resistance of the reference resistor.

* * * * *